United States Patent
Goodwin et al.

(10) Patent No.: US 9,658,437 B2
(45) Date of Patent: May 23, 2017

(54) LITHIUM CONTAINING GLASS WITH HIGH OXIDIZED IRON CONTENT AND HAVING SPECIFIED BASE, COLORANT, AND OXIDIZER

(71) Applicant: PPG INDUSTRIES OHIO, INC., Cleveland, OH (US)

(72) Inventors: George B. Goodwin, Cranberry Township, PA (US); Mehran Arbab, Pittsburgh, PA (US); Caroline S. Harris, Pittsburgh, PA (US); Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 235 days.

(21) Appl. No.: 13/768,030

(22) Filed: Feb. 15, 2013

(65) Prior Publication Data

US 2014/0029088 A1     Jan. 30, 2014

Related U.S. Application Data

(60) Provisional application No. 61/602,909, filed on Feb. 24, 2012.

(51) Int. Cl.
*C03C 4/08*     (2006.01)
*G02B 13/14*    (2006.01)
(Continued)

(52) U.S. Cl.
CPC ........ *G02B 13/14* (2013.01); *B32B 17/10045* (2013.01); *B32B 17/10119* (2013.01);
(Continued)

(58) Field of Classification Search
None
See application file for complete search history.

(56) References Cited

U.S. PATENT DOCUMENTS

| | | | |
|---|---|---|---|
| 3,869,270 A | 3/1975 | Brungs et al. | |
| 4,156,755 A | 5/1979 | Rinehart | |

(Continued)

FOREIGN PATENT DOCUMENTS

| | | |
|---|---|---|
| DE | 102010013641 A1 | 10/2011 |
| RU | 2 246 454 C2 | 2/2005 |

(Continued)

OTHER PUBLICATIONS

Trier W. ED—Trier W: "Glass Furnaces, Design Construction and Operation; Passage", Jan. 1, 1984, Glass Furnaces: Design, Construction and Operation. Translation of Giasschmelzofen. Konstruktion Und Betnebsverhalten, Springer Verlag 1984, Sheffield, Soc. of Glass Technology, GB, p. 164-169, XP002030682.

(Continued)

*Primary Examiner* — Jennifer L Doak
*Assistant Examiner* — Ryan S Dunning
(74) *Attorney, Agent, or Firm* — Donald Lepiane

(57) ABSTRACT

A low infrared absorbing lithium glass includes FeO in the range of 0.0005-0.015 wt %, more preferably 0.001-0.010 wt %, and a redox ratio in the range of 0.005-0.15, more preferably in the range of 0.005-010. The glass can be chemically tempered and used to provide a ballistic viewing cover for night vision goggles or scope. A method is provided to change a glass making process from making a high infrared absorbing lithium glass having FeO in the range of 0.02 to 0.04 wt % and a redox ratio in the range of 0.2 to 0.4 to the low infrared absorbing lithium glass by adding additional oxidizers to the batch materials. A second method is provided to change a glass making process from making a low infrared absorbing lithium glass to the high infrared absorbing lithium glass by adding additional reducers to the batch material. In one embodiment of the invention the oxidizer is $CeO_2$. An embodiment of the invention covers a glass made according to the method.

14 Claims, 4 Drawing Sheets

(51) Int. Cl.

| | | |
|---|---|---|
| *C03C 3/085* | (2006.01) | |
| *B32B 17/10* | (2006.01) | |
| *C03C 1/00* | (2006.01) | |
| *C03C 3/083* | (2006.01) | |
| *C03C 3/095* | (2006.01) | |
| *C03C 4/10* | (2006.01) | |
| *F41H 5/04* | (2006.01) | |
| *C03B 5/173* | (2006.01) | |
| *C03C 10/00* | (2006.01) | |
| *G02B 5/22* | (2006.01) | |

(52) U.S. Cl.
CPC ........ *B32B 17/10137* (2013.01); *C03B 5/173* (2013.01); *C03C 1/004* (2013.01); *C03C 3/083* (2013.01); *C03C 3/085* (2013.01); *C03C 3/095* (2013.01); *C03C 4/082* (2013.01); *C03C 4/10* (2013.01); *F41H 5/0407* (2013.01); *B32B 2605/18* (2013.01); *C03C 10/0027* (2013.01); *G02B 5/226* (2013.01); *Y02P 40/57* (2015.11)

(56) References Cited

U.S. PATENT DOCUMENTS

| | | | |
|---|---|---|---|
| 4,792,536 A | 12/1988 | Pecoraro et al. | |
| 5,006,144 A | 4/1991 | Knavish et al. | |
| 5,030,594 A | 7/1991 | Heithoff | |
| 5,344,798 A * | 9/1994 | Morimoto et al. | 501/70 |
| 5,469,657 A | 11/1995 | Drew | |
| 5,851,940 A * | 12/1998 | Boulos et al. | 501/71 |
| 5,873,203 A | 2/1999 | Thiel | |
| 6,664,204 B1 | 12/2003 | Costin | |
| 7,482,294 B2 | 1/2009 | Landa et al. | |
| 2003/0015648 A1 | 1/2003 | Janeczko et al. | |
| 2004/0121896 A1 | 6/2004 | Landa et al. | |
| 2005/0090377 A1* | 4/2005 | Shelestak | C03C 3/083 501/69 |
| 2007/0213196 A1 | 9/2007 | Jones et al. | |
| 2009/0109654 A1* | 4/2009 | Fechner et al. | 362/97.1 |
| 2009/0205711 A1 | 8/2009 | Polcyn | |
| 2010/0126218 A1 | 5/2010 | Shelestak et al. | |
| 2010/0252787 A1 | 10/2010 | Jones | |
| 2013/0189486 A1 | 7/2013 | Wang et al. | |
| 2013/0199360 A1 | 8/2013 | Schaupert et al. | |

FOREIGN PATENT DOCUMENTS

| | | |
|---|---|---|
| WO | 2010059559 A1 | 5/2010 |
| WO | 2011103799 A1 | 9/2011 |

OTHER PUBLICATIONS

PCT Search Report, International Application No. PCT/US2013/026344, dated Jun. 27, 2013.

\* cited by examiner

LITHIUM CONTAINING GLASS WITH HIGH OXIDIZED IRON CONTENT AND HAVING SPECIFIED BASE, COLORANT, AND OXIDIZER

CROSS REFERENCE TO RELATED APPLICATION

This application claims the benefits of U.S. Provisional Patent Application Ser. No. 61/602,909 filed Feb. 24, 2012 and titled "LITHIUM CONTAINING GLASS WITH HIGH OXIDIZED IRON CONTENT AND METHOD OF MAKING SAME". Application Ser. No. 61/602,909 in its entirety is incorporated herein by reference.

BACKGROUND OF THE INVENTION

Field of the Invention

This invention relates to a glass having a high oxidized iron content, and to methods of making such glasses, and more particularly, to a method of changing from a Campaign making a high infrared absorbing glass, i.e., a glass having high reduced iron content, to a Campaign making a low infrared absorbing glass, i.e., a glass having low reduced iron content, and the glasses made thereby. Also disclosed herein is a method of changing from a Campaign making a low infrared absorbing glass, i.e., a glass having low reduced iron content, to a Campaign making a high infrared absorbing glass, i.e., a glass having high reduced iron content, and the glasses made thereby. As used herein the term "Campaign" means making a predetermined amount of glass, e.g. but not limited to a flat glass ribbon, having a predetermined range of properties, e.g. but not limited to optical and colored properties using a predetermined amount of glass batch materials or ingredients.

Discussion of the Technology

Of particular interest in the following discussion is the manufacture of lithium containing glasses. As is appreciated by those skilled in the art, lithium containing glasses are usually used as a substrate to make ion exchanged strengthened glass. One type of lithium containing glass is disclosed in U.S. Pat. No. 4,156,755 ("hereinafter also referred to as "U.S. Pat. No. '755"), which patent is incorporated herein by reference.

In general, iron is not a required ingredient to make lithium containing glass for the ion exchange process, however, small amounts of iron are usually present in the lithium containing glass as an impurity in the glass batch ingredients, or the iron is added to the glass batch materials to provide a lithium containing glass having desired properties, e.g. but not limited to optical and/or colored properties. Total iron oxide content as $Fe_2O_3$ in commercial glasses depends on the product requirements but are commonly in the range of 50-1200 parts per million {hereinafter also referred to as "PPM"} or 0.005-0.12% of the total iron by weight on the oxide basis (hereinafter referred to as "percent by weight" or "wt %") for what are considered clear glass compositions. More particularly, the addition of iron can be made as ferrous iron (FeO) or as ferric iron ($Fe_2O_3$). During the melting of the glass batch materials, equilibrium is reached between the ferric form of iron (Fe+++) and the ferrous form of iron (Fe++) with about 25-30 wt % of the iron in the ferrous form (Fe++) and 70-75 wt % of the iron in the ferric form (Fe+++). The ferric oxide, $Fe_2O$, is a strong ultraviolet radiation absorber and operates as a yellow colorant in the glass, and the ferrous oxide, FeO, is a strong infrared radiation absorber and operates as a blue colorant in the glass. Of particular interest in the present discussion is the ferrous oxide, FeO.

In the instance when a glass sheet, for example but not limiting to the discussion, a lithium containing glass sheet (hereinafter also referred to as a "lithium glass sheet") is to be heated, e.g. but not limiting to the discussion, prior to bending and shaping, the composition of the lithium glass sheet usually includes ferrous oxide (FeO) in the range of 0.02 to 0.04 wt %, and the lithium glass sheet has a redox ratio (discussed in detail below) of 0.2 to 0.4. In the instance when a lithium containing glass (hereinafter also referred to as "lithium glass") is to be used in the practice of the invention as a viewing window for infrared equipment, e.g. but not limited to, infrared night goggles, or as components of transparent armor or aerospace windows, the ferrous oxide is preferably in the range of 0.001 to 0.010 wt %, and the lithium glass has a preferred redox ratio in the range of 0.005 to 0.10. The wt % of ferrous oxide is higher for the lithium glass sheet to be heated to increase the absorption of the infrared wavelengths to decrease the heating time of the lithium glass sheet to reach the bending temperatures. The wt % of the ferrous oxide is low for the lithium glass to be used for a viewing window for infrared equipment in accordance to the teachings of the invention to increase the percent transmittance of infrared energy through the viewing window.

One of the drawbacks with going from a Campaign making a high infrared absorbing (hereinafter also referred to as "HIRA") lithium glass to a Campaign making low infrared absorbing (hereinafter also referred to as "LIRA") lithium glass of the invention, and/or going from a Campaign making a LIRA lithium glass of the invention to a Campaign making HIRA lithium glass, is the quantity of glass produced during the period starting at the end of one Campaign, e.g. the end of the Campaign to make HIRA lithium glass, and ending at the start of the next Campaign, e.g. the start of the Campaign to make LIRA lithium glass that meets the specifications for LIRA lithium glass or HIRA lithium glass. The glass that is out of specifications for use as LIRA lithium glass and HIRA lithium glass is usually scrapped or used as cullet. It can now be appreciated by those skilled in the art that discarding the glass made during the change from one Campaign to another Campaign is costly due to the relatively high batch cost for lithium glass and to the time wasted making unusable glass or glass of marginal quality.

It is advantageous, therefore, to provide a method of minimizing or eliminating the drawbacks associated with changing from a Campaign making useable HIRA lithium glass or useable LIRA lithium glass to a Campaign making useable LIRA lithium glass or useable HIRA lithium glass, respectively.

SUMMARY OF THE INVENTION

One non-limiting embodiment of the invention relates to a glass composition including, among other things,

| Component | Range |
|---|---|
| $SiO_2$ | 60-63 wt % |
| $Na_2O$ | 10-12 wt % |
| $Li_2O$ | 4-5.5 wt % |
| $Al_2O_3$ | 17-19 wt % |
| $ZrO_2$ | 3.5-5 wt % |

| Component | Range |
| --- | --- |
| (Al$_2$O$_3$ + ZrO$_2$) | 21.5-24 wt % |
| FeO | 0.0005-0.015 wt % |
| Fe$_2$O$_3$ (total iron) | 50-1200 ppm; or 0.005-0.12 wt % | and an oxidizer selected from the group of cerium oxide in the range of greater than 0 to 0.50 wt %, manganese oxide in the range of greater than 0 to 0.75 wt % and mixtures thereof, and a redox ratio in the range of 0.005-0.15.

Another non limiting embodiment of the invention relates to a device for viewing radiated infrared energy, the device comprising a housing having at least one passageway, the passageway having a first open end and a second open end, a lens system mounted within the passageway for viewing radiated infrared energy, the improvement comprising:

a chemically tempered ballistic glass lens mounted adjacent to one end of the passageway, the ballistic glass lens comprising a first surface, an opposite second surface and a glass segment between the first and the second surfaces of the ballistic glass lens, the glass segment including, among other things,

| Component | Range |
| --- | --- |
| SiO$_2$ | 60-63 wt % |
| Na$_2$O | 10-12 wt % |
| Li$_2$O | 4-5.5 wt % |
| Al$_2$O$_3$ | 17-19 wt % |
| ZrO$_2$ | 3.5-5 wt % |
| (Al$_2$O$_3$ + ZrO$_2$) | 21.5-24 wt % |
| FeO | 0.0005-0.015 wt % |
| Fe$_2$O$_3$ (total iron) | 50-1200 ppm; or 0.005-012 wt %; | and an oxidizer selected from the group of cerium oxide in the range of greater than 0 to 0.50 wt %, manganese oxide in the range of greater than 0 to 0.75 wt % and mixtures thereof, and a redox ratio in the range of 0.005-0.15.

Further, another non-limiting embodiment of the invention relates to a method of changing molten glass in a furnace from a molten high infrared absorbing lithium glass composition having FeO in the range of 0.02 to 0.04 wt % and a redox ratio in the range of 0.2 to 0.4 to a molten low infrared absorbing lithium glass composition having FeO in the range of 0.0005 to 0.015 wt %, a redox ratio in the range of 0.005 to 0.15 and a predetermined amount of a first oxidizer to oxidize the FeO, the method includes, among other things:

feeding glass batch material having ingredients to provide the molten low infrared absorbing lithium glass composition having FeO in the range of 0.0005 to 0.015 wt %, a redox ratio in the range of 0.005 to 0.15 and the predetermined amount of a first oxidizer to oxidize the FeO;

adding a second oxidizer to the glass batch material in an amount equal to one or two times the amount of the first oxidizer for a predetermined period of time to oxidize the FeO in the molten glass in the furnace, and ceasing the practice of the above steps after the predetermined period of time.

Still further, a non-limiting embodiment of the invention relates to a laminated transparency, e.g. an aircraft and land vehicle windshield comprising a plurality of glass sheets, wherein at least one of the glass sheets is chemically strengthened and optionally plastic sheets, wherein the glass sheets and the plastic sheets are laminated together by plastic interlayers and at least one of the glass sheets has a glass composition including, among other things:

| Component | Range |
| --- | --- |
| SiO$_2$ | 60-63 wt % |
| Na$_2$O | 10-12 wt % |
| Li$_2$O | 4-5.5 wt % |
| Al$_2$O$_3$ | 17-19 wt % |
| ZrO$_2$ | 3.5-5 wt % |
| (Al$_2$O$_3$ + ZrO$_2$) | 21.5-24% |
| FeO | 0.0005-0.015 wt % |
| Fe$_2$O$_3$ (total iron) | 50-1200 ppm; | and an oxidizer selected from the group of cerium oxide in the range of greater than 0 to 0.50 wt %, manganese oxide in the range of greater than 0 to 0.75 wt % and mixtures thereof, and a redox ratio in the range of 0.005-0.15.

In addition the invention relates to a method of changing molten glass in a furnace from a molten low infrared absorbing lithium glass composition having FeO in the range of 0.0005 to 0.015 wt %, and a redox ratio in the range of 0.005 to 0.10 to a high infrared absorbing lithium glass composition having FeO in the range of 0.02 to 0.04 wt % and a redox ratio in the range of 0.2 to 0.4, by, among other things, feeding glass batch material having ingredients to provide the molten high infrared absorbing lithium glass composition and the predetermined amount of a first reducing agent to increase the FeO; adding a second reducing agent to the glass batch material in an amount equal to one or two times the amount of the first reducing agent for a predetermined period of time to increase the FeO in the molten glass in the furnace, and ceasing the practice of the preceding steps after the predetermined period of time.

DESCRIPTION OF THE INVENTION

Figure 1:
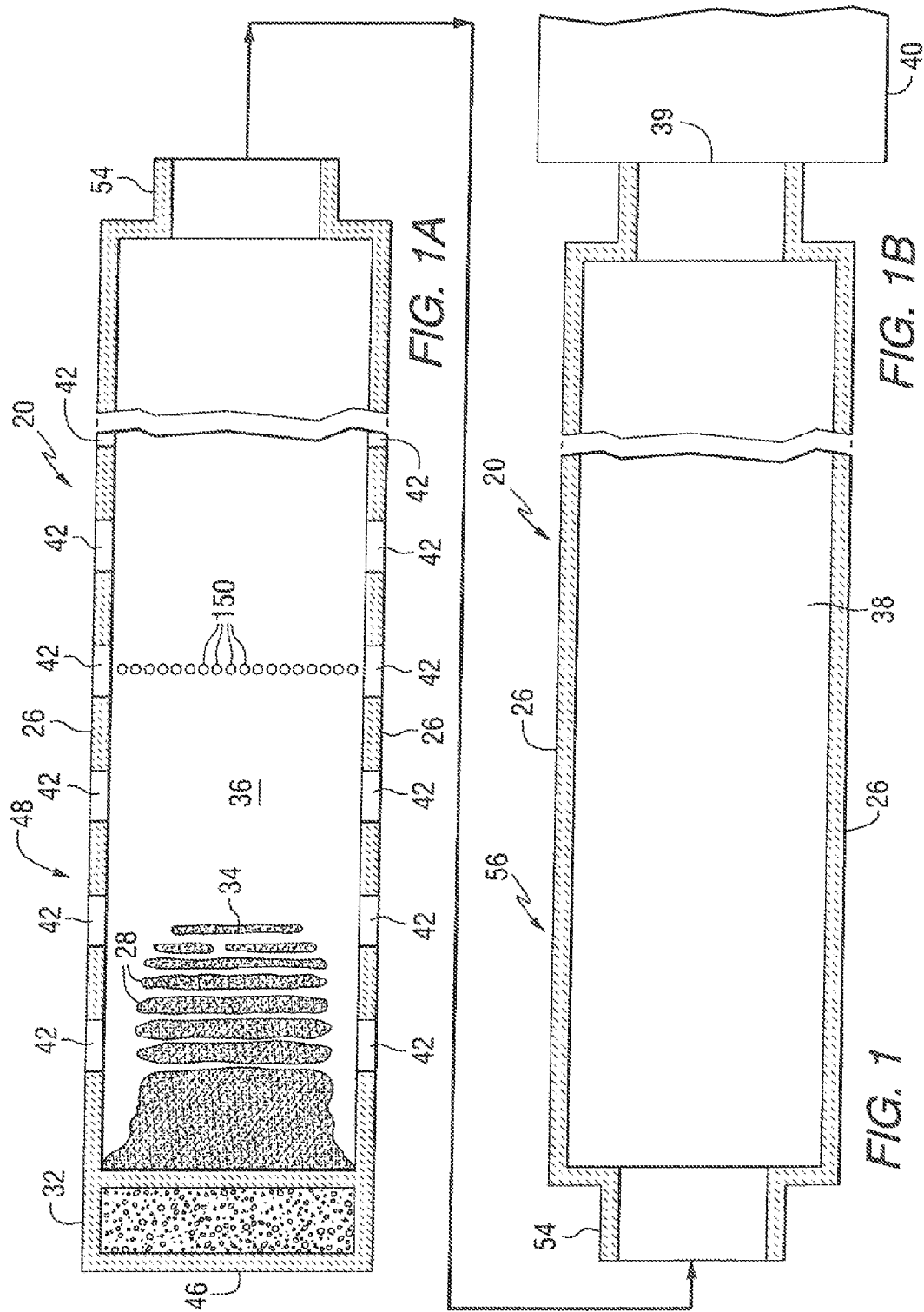
FIGS. 1A and 1B are plane views in cross section of a glass-melting furnace connected to a glass-forming chamber of the type used to make a float glass ribbon in accordance to the teachings of the invention.

As used herein, spatial or directional terms such as "inner", "outer", "left", "right", "up", "down", "horizontal", "vertical", and the like, relate to the invention as it is shown in the drawing on the figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the term "mounted over" means mounted over but not necessarily in surface contact with. For example, one article or component of an article "mounted over" another article or component of an article does not preclude the presence of materials between the articles, or between components of the article, respectively.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

The non-limiting embodiments of the invention are disclosed using the lithium glass compositions disclosed in U.S. Pat. No. '755, however, the invention, it is not limited thereto, and the invention can be practiced to change from one Campaign making a soda-lime-silicate glass having a high oxidized iron content, e.g. but not limited to ferrous oxide in the range of 0.02 to 0.04 wt %, and a redox ratio in the range of 0.2 to 0.4, to another Campaign making a soda-lime-silicate glass having a low oxidized iron content, e.g. but not limited to ferrous oxide in the range of 0.001 to 0.010 wt %, and a redox ratio in the range of 0.005 to 0.15.

As can now be appreciated, $Fe_2O_3$ and/or FeO can be added as a colorant or a property modifier. The total amount of iron present in the lithium glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO even though it may not actually be present in the glass as FeO. In order to reflect the relative amounts of ferrous and ferric iron in the glass compositions disclosed herein, the term "redox ratio" shall mean the amount of iron in the ferrous state expressed as FeO divided by the amount of total iron expressed as $Fe_2O_3$. Furthermore, unless stated otherwise, the term "total iron" in this specification shall mean total iron expressed in terms of $Fe_2O_3$ and the term "FeO" shall mean iron in the ferrous state expressed in terms of FeO.

The ranges of materials or ingredients of the lithium containing glass disclosed in U.S. Pat. No. '755 are listed in following Table 1.

TABLE 1

| Component | Range | Preferred Range |
| --- | --- | --- |
| $SiO_2$ | 59-63 wt % | 60-63 wt % |
| $Na_2O$ | 10-13 wt % | 10-12 wt % |

TABLE 1-continued

| Component | Range | Preferred Range |
| --- | --- | --- |
| $Li_2O$ | 4-5.5 wt % | 4-5.5 wt % |
| $Al_2O_3$ | 15-23 wt % | 17-19 wt % |
| $ZrO_2$ | 2-5 wt % | 3.5-5% |
| $Al_2O_3 + ZrO_2$) | 19-25 wt % | 21.5-24 wt % |

The weight percent of all the oxides in the glass except for lithium are measured using X-Ray Fluorescence Spectroscopy (also known as "XRFS"). The weight percent of lithium oxide in the glass is measured by atomic absorption.

Minor quantities (up to about 5% by weight total) of other glass forming materials and glass modifiers or colorants can be included, e.g. MgO, MnO, $TiO_2$, $Sb_2O_3$, $As_2O_3$, $K_2O$, PbO, ZnO and CaO, and mixtures thereof. As is appreciated by those skilled in the art, $Sb_2O_3$ and $As_2O_3$ are oxidizers for the glass sheet drawing process, but are not compatible for use in the float glass process because the reducing conditions of the float glass chamber reduces the $Sb_2O_3$ and $As_2O_3$ to antimony and arsenic metals, respectively.

In one non-limiting embodiment of the invention, when the lithium glass sheet having the composition of Table 1 is to be heated, e.g. but not limiting to the discussion, prior to bending and/or shaping of the sheet, the lithium glass composition contains the ingredients of Table 1 plus ferrous oxide in the range of 0.02 to 0.05 wt %, and preferably in the range of 0.03 to 0.038 wt %, and a redox ratio in the range of 0.2 to 0.4 and preferably in the range of 0.2 to 0.35 (hereinafter the preceding glass is also referred to as "high infrared absorbing lithium glass" or "HIRA lithium glass"). During the Campaign to make the HIRA lithium glass, additions of sulfates and carbon are made to the glass batch ingredients. The sulfates and carbon additions are made to increase the ferrous oxide content to maintain the molten glass within the desired redox ratio range.

In another non-limiting embodiment of the invention, when the lithium containing glass having the composition of Table 1 is used as a viewing window for infrared equipment, e.g. but not limited to infrared night goggles, scopes, e.g. rifle scopes, the lithium glass composition contains the ingredients of Table 1. As noted, oxides of iron are not listed as a component, however, as is appreciated by those skilled in the art, it is expected that oxides of iron, e.g. ferrous iron will be present in the glass as a tramp material found in the batch materials, e.g. glass cullet. To the extent ferrous iron can be present, the invention contemplates that the glass of the invention will include the composition of Table 1 plus ferrous oxide in the range of 0.0005 to 0.015 wt %, and preferably in the range of 0.001 to 0.010 wt %, and a redox ratio in the range of 0.005 to 0.15 and preferably in the range of 0.005 to 0.10 (hereinafter the preceding glass is also referred to as "low infrared absorbing lithium containing glass" or "LIRA lithium glass"). It is expected that the total iron ($Fe_2O_3$) will be in the range of 50 to 200 ppm $Fe_2O_3$. During the Campaign to make the LIRA lithium glass, additions of oxidizers compatible with the selected glass making processes are added to the glass, e.g. cerium oxide, manganese oxide, antimony oxide, arsenic oxide and combinations thereof are added to the glass batch ingredients to maintain the molten glass within the redox ratio range for a LIRA lithium glass.

As discussed above, the wt % of ferrous oxide is higher for the HIRA lithium glass to increase the absorption of the infrared wavelengths to decrease the heating time of the glass to reach the bending temperatures or to provide a level of solar heat control, and the wt % of the ferrous iron is lower for the LIRA lithium glass to reduce the absorption of infrared energy in the infrared viewing range and increase the percent transmittance of the infrared energy in the infrared viewing range to enhance the viewing of the infrared generating objects. For purposes of clarity, the ultraviolet wavelength range is 300 to 380 nanometers (hereinafter also referred to as "nm"); the visible wavelength range is 380 to 780 nm; and the near infrared wavelength range is 800 to 2100 nm; of the electromagnetic spectrum. The infrared viewing wavelength range is device dependent. In one non-limiting embodiment of the invention, the infrared viewing wavelength range is 400 to 920 nm of the electromagnetic spectrum. In the practice of the invention, the LIRA lithium glass preferably has a visible transmission of equal to and greater than 88%, more preferably a visible transmission of greater than 89% and most preferably a visible transmission of greater than 90%; an infrared transmission of equal to and greater than 80%, more preferably an infrared transmission of greater than 85% and most preferably an infrared transmission of equal to and greater than 90%; an infrared viewing transmission of equal to and greater than 80%, more preferably an infrared viewing transmission of greater than 85% and most preferably an infrared viewing transmission of greater than 90%.

Further, in the practice of the invention, the HIRA lithium glass has a visible transmission of less than 88%; an infrared transmission of less than 75%; an infrared viewing transmission of less than 80%.

The spectral properties of the LIRA lithium glass given above are reported at a thickness of 0.223 inch (5.7 millimeters). The visible transmission is determined using CIE Standard Illuminant A with a 2° observer over a wavelength range of 380 to 780 nanometers. The infrared transmittance is determined using Parry Moon air mass 2.0 direct solar irradiance data over a wavelength range of 800 to 2100 nm. The viewing transmittance is determined using the relative spectral irradiance of CIE Standard Illuminant A and the response function of the viewing device over the wavelength range 400 to 930 nm.

Figure 2:
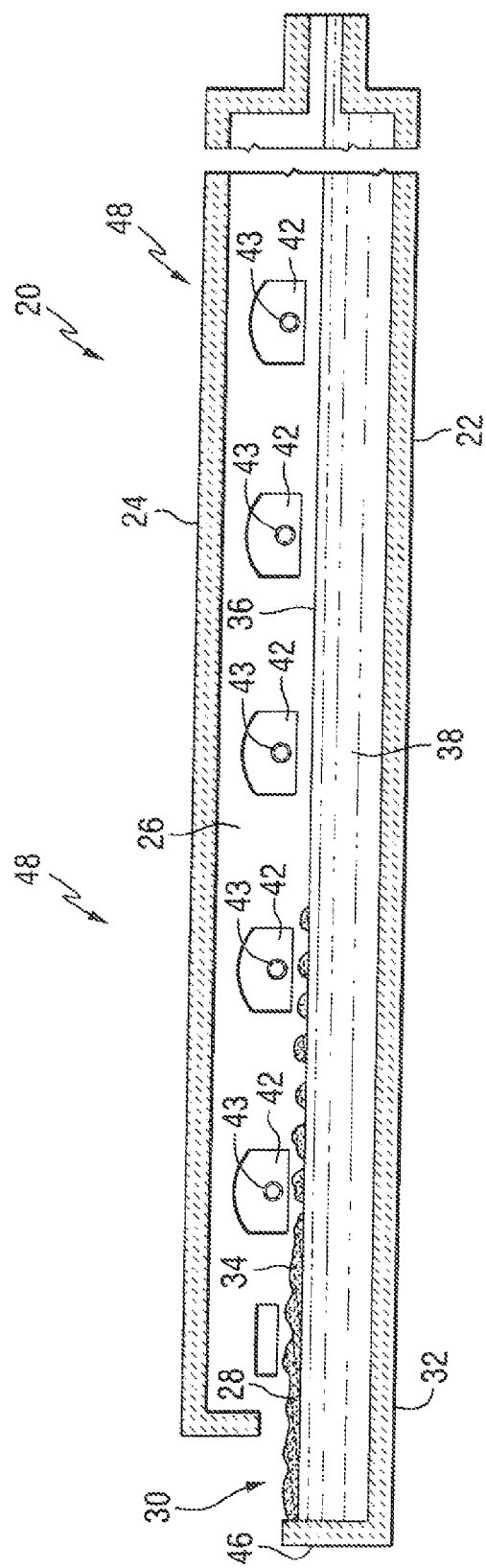
FIG. 2 is an elevated cross sectional side view of the glass melting chamber shown in FIG. 1A.

The LIRA and HIRA lithium glasses of the invention can be made using a conventional non-vacuum refiner float glass system, e.g. but not limited to the type shown in FIGS. 1 and 2, or using a vacuum refiner float glass system, e.g. but not limited to the type disclosed in U.S. Pat. Nos. 4,792,536 and 5,030,594, which patents are hereby incorporated by reference).

Referring to FIGS. 1A, 1B and 2, conventional continuously fed, cross-tank fired, glass melting and non-vacuum refining furnace 20 includes an enclosure formed by a bottom 22, roof 24, and sidewalls 26 made of refractory materials. The HIRA or the LIRA lithium glass batch materials 28 are introduced through inlet opening 30 (see FIG. 2) in an extension 32 of the furnace 20 known as the fill doghouse in any convenient or usual manner to form a blanket 34 floating on surface 36 of molten glass 38 (see FIG. 2). Overall progression of the glass as shown in FIGS. 1A and 1B is from left to right in the figures, toward entrance end 39 of a glass forming chamber 40 (see FIG. 1B) of the type used in the art to make float flat glass.

Flames (not shown) to melt the batch materials 28 and to heat the molten glass 38 issue from burner ports 42 spaced along the sidewalls 26 (see FIG. 2) and are directed onto and across the surface 36 of the molten glass 38. As is known by those skilled in the art, during the first half of a heating cycle, the flames issue from a nozzle 43 (see FIG. 2) in each of the ports on one side of the tank 20, as the exhaust of the furnace moves through the ports on the opposite side of the furnace. During the second half of the heating cycle, the function of the ports is reversed, and the exhaust ports are the firing ports, and the firing ports are the exhaust ports. The firing cycle for furnaces of the type shown in FIGS. 1A, 1B and 2 are well known in the art and no further discussion is deemed necessary.

As can be appreciated by those skilled in the art, the invention contemplates using a mixture of air and fuel gas, or a mixture of oxygen and fuel gas, to generate the flames to heat the batch materials and the molten glass. For a discussion of using oxygen and fuel gas in a glass melting furnace, reference can be made to U.S. Patent Application Publication No. 2009-0205711 A1 titled "Use of Photovoltaic for Waste Heat Recovery", which Publication is incorporated herein by reference).

The glass batch materials 28 moving downstream from the batch feeding end or doghouse end wall 46 are melted in the melting section 48 of the furnace 20, and the molten glass 38 moves through waist 54 (see FIG. 1B) to refining section 56 of the furnace 20. In the refining section 56, bubbles in the molten glass 38 are removed, and the molten glass 38 is mixed or homogenized as the molten glass passes through the refining section 56. The molten glass 38 is delivered in any convenient or usual manner from the refining section 56 onto a pool of molten metal (not shown) contained in the glass-forming chamber 40. As the delivered molten glass 38 moves through the glass-forming chamber 40 on the pool of molten metal (not shown), the molten glass is sized and cooled. A dimensionally stable sized glass ribbon (not shown) moves out of the glass-forming chamber 40 into an annealing lehr (not shown). Glass making apparatus of the type shown in FIGS. 1A, 1B and 2, and of the type discussed above are well known in the art and no further discussion is deemed necessary.

As can now be appreciated by those skilled in the art, when changing from a Campaign making HIRA lithium glass to a Campaign making LIRA lithium glass, the ferrous iron in the molten HIRA lithium glass contained in the furnace 20 (see FIGS. 1A, 1B and 2) at the end of the Campaign for making HIRA lithium glass is preferably decreased to a range of 0.0005 to 0.015 wt %, and more preferably to a range of 0.001-0.010 wt %, and the redox ratio is preferably reduced to a range of 0.005-0.15 and more preferably to a range of 0.005-0.10. In the practice of the invention, the conversion of the molten HIRA lithium glass in the furnace, e.g. 1850 tons, to molten LIRA lithium glass is made in 3 to 4 days, whereas to make the conversion by adding only LIRA lithium glass batch ingredients without oxidizers would take about two weeks.

In the practice of the invention, the change from molten HIRA lithium glass to molten LIRA lithium glass can be made in 3 to 4 days using an oxidizing agent. In one non-limiting embodiment of the invention, cerium oxide ($CeO_2$) and/or manganese oxide ($MnO_2$) is/are used to oxidize the ferrous iron to the ferric iron because, as discussed above, they are compatible with the glass making process shown in FIGS. 1A, 1B and 2. In the preferred practice of the invention, cerium oxide ($CeO_2$) is used to oxidize the ferrous iron to the ferric iron because cerium oxide ($CeO_2$) is a more effective oxidizer than manganese oxide ($MnO_2$) as shown by a conducted experiment.

More particularly, samples of the glass shown in Table 2 (also referred to as "Control Sample"); samples of the glass shown in Table 1 with additions of $CeO_2$ (also referred to as "Cerium Samples"), and samples of the glass shown in Table 1 with additions of $MnO_2$ (also referred to as "Manganese Samples"), were made. Samples 1-5 are the Cerium Samples having varying amounts of cerium oxide, and Samples 6 and 7 are the Manganese Samples having varying amounts of manganese oxide.

TABLE 2

| Ingredient | Control | 1 | 2 | 3 | 4 | 5 | 6 | 7 |
|---|---|---|---|---|---|---|---|---|
| | | | | (wt %) | | | | |
| $CeO_2$ | 0 | 0.165 | 0.245 | 0.270 | 0.375 | 0.437 | 0 | 0 |
| $MnO_2$ | 0 | 0 | 0 | 0 | 0 | 0 | 0.175 | 0.325 |
| FeO | 0.017 | 0.007 | 0.004 | 0.002 | 0.001 | 0.001 | 0.012 | 0.007 |
| $FeO/Fe_2O_3$ | 0.189 | 0.083 | 0.044 | 0.020 | 0.019 | 0.009 | 0.132 | 0.072 |

Figure 3:
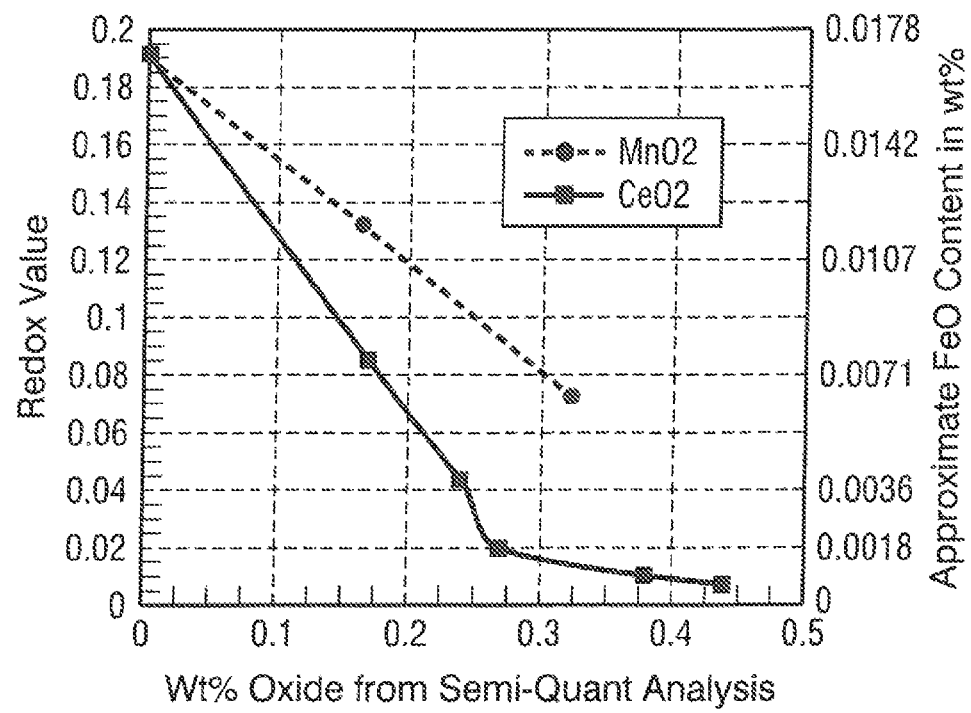
FIG. 3 is a graph showing the redox value and approximate ferrous iron (FeO) content as a result of the oxidation of FeO by different amounts of CeO$_2$ and MnO$_2$.
Figure 4:
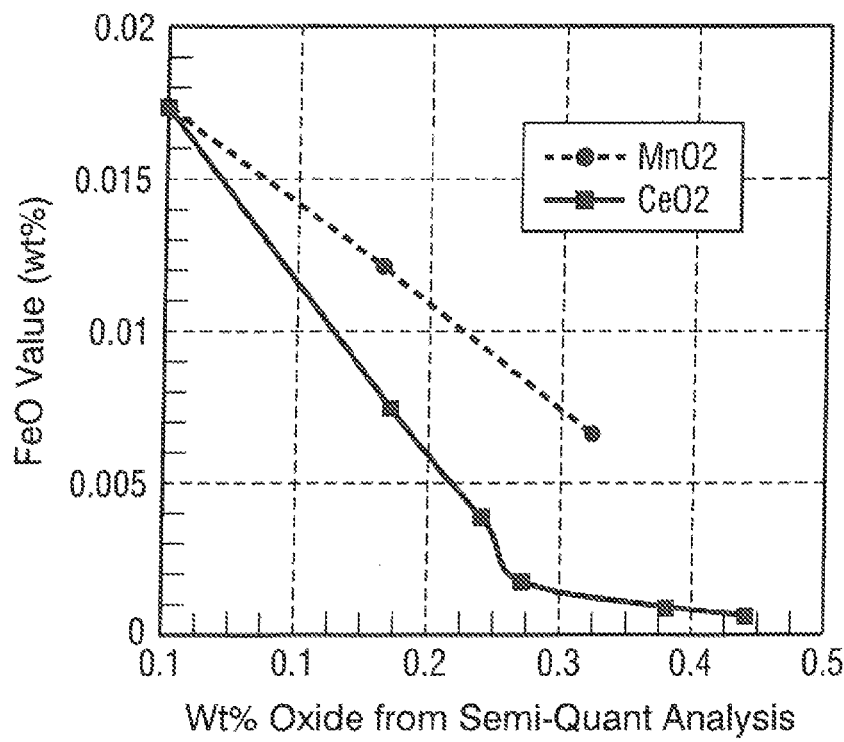
FIG. 4 is a graph showing the oxidation of ferrous iron (FeO) by different amounts of CeO$_2$ and MnO$_2$.

FIG. 3 is a plot showing the redox ratio and approximate FeO content, and FIG. 4 is a plot showing the ferrous oxide content, of the Control Sample and the Samples 1-7 on the ordinate (y axis) and the wt % of the cerium oxide and manganese oxide on the abscissa (x axis). The control sample data point is on the y axis. In the preferred practice of the invention, cerium oxide is used to oxidize the ferrous iron to the ferric iron because as shown in FIGS. 3 and 4 the cerium oxide is a more effective oxidizer than manganese oxide, and the cerium oxide "decolorizes" the glass. More particularly, cerium oxide is not a colorant in glass, but cerium oxide is a powerful oxidizing agent in glass, and its function in decolorized glass is to oxidize the iron in the ferrous state (Fe++) to iron in the ferric (Fe+++) state. Although cerium oxide is useful to decolorize the remaining traces of ferrous iron, the use of cerium oxide has limitations, e.g. but not limiting to the discussion, exposing the LIRA lithium glass to the sun has a solarizing effect on the glass, which results from the photo-oxidation of Ce+++ to Ce++++ and the photo-reduction of Fe+++ to Fe++. As is appreciated by those skilled in the art, the solarization effect of cerium and the photo-reduction of Fe+++ to Fe++ reduces the transmission, and increases the absorption of the glass in the visible and the IR ranges of the electromagnetic spectrum. Because the reduction in visible and infrared transmission is less than 1%, cerium oxide is preferred to oxidize the ferrous iron. Nevertheless, the invention contemplates adding manganese oxide instead of cerium oxide and adding mixtures of manganese oxide and cerium oxide.

In the practice of the invention, cerium oxide in the range of greater than 0 to 0.50 wt % can be used; in the range of 0.02 to 0.45 wt % is preferred, and in the range of 0.04 to 0.40 wt % is more preferred. Other ranges for cerium oxide include but are not limited to 0.01 to 0.15 wt %; 0.02 to 0.10 wt % and 0.03 to 0.07 wt %. Manganese oxide in the range of greater than 0 to 0.75 wt % can be used, in the range of 0.02 to 0.50 wt % is preferred, and in the amount of 0.04 to 0.45 wt % is more preferred. As can be appreciated, a mixture of $CeO_2$ and $MnO_2$ can be used in the practice of the Invention to oxidize the ferrous iron. Generally for the given range of $MnO_2$, one part of $CeO_2$ replaces 1.10 to 1.50 parts of $MnO_2$, and for the given range of $CeO_2$, 1.10 to 1.5 parts of $MnO_2$ replaces one part of $CeO_2$. Glasses of lower total iron content can use lower amounts of cerium oxide or manganese oxide. The amount of cerium oxide or manganese oxide in this specification shall mean total cerium or manganese, respectively, expressed in terms of $CeO_2$ or $MnO_2$, even though these components may not actually be present in the glass as $CeO_2$ or $MnO_2$.

In the following non-limiting embodiment of the invention, Campaign A is active to make HIRA lithium glass. Campaign A is designated to end and Campaign B started to make LIRA lithium glass. The composition of the HIRA lithium glass being made and the composition of the LIRA lithium glass to be made are shown in TABLE 3.

TABLE 3

| Component | HIRA Lithium glass Campaign A | LIRA Lithium glass Campaign B |
|---|---|---|
| $SiO_2$ | 59-63 wt % | 60-63 wt % |
| $Na_2O$ | 10-13 wt % | 10-12 wt % |
| $Li_2O$ | 4-5.5 wt % | 4-5.5 wt % |
| $Al_2O_3$ | 15-23 wt % | 17-19 wt % |
| $ZrO_2$ | 2-5 wt % | 3.5-5 wt % |
| $(Al_2O_3 + ZrO_2)$ | 19-25 wt % | 21.5-24 wt % |
| FeO | 0.02-0.05 wt % | 0.001-0.010 wt % |
| $FeO/Fe_2O_3$ | 0.2-0.4 | 0.005-0.10 |
| $CeO_2$ | 0.00 | 0.02-0.45 wt % |
| $Fe_2O_3$ (total iron) | 800-1200 ppm | 50-1200 ppm |

During the running of Campaign A, the HIRA lithium glass batch materials are fed into the furnace 20 (see FIGS. 1A, 1B and 2), melted, refined and the refined glass moved into the glass forming chamber 40 as discussed above to make the HIRA lithium glass having the composition shown in TABLE 3. At the designated time when Campaign A is to end, the glass batch materials for the LIRA lithium glass are moved into the melting section 48 of the furnace 20 as discussed above to start Campaign B. During the first 36 hour period of Campaign B, the batch materials for the LIRA lithium glass are formulated to provide a lithium glass having cerium oxide in the range of 0.04-0.90 wt %, i.e. twice the cerium oxide specified for the lithium glass of TABLE 3. After the thirty six hour period, the batch materials for the LIRA lithium glass are formulated to provide a lithium glass having cerium oxide in the range of 0.02-0.45 wt % (see TABLE 3).

In one embodiment of the invention, cerium carbonate is added to the batch materials to provide the cerium oxide in the glass. To make the LIRA lithium glass of TABLE 3 cerium carbonate in the range of 0.033-0.75 wt % is added to the batch materials. With the initial LIRA lithium glass batch materials (the first thirty six hour period of Campaign B), cerium carbonate in the range of 0.066-1.50 wt % is added to the batch materials. At the end of the initial thirty six hour period of Campaign B, the cerium carbonate is reduced to a range of 0.033-0.75 wt % to run Campaign B to make the LIRA lithium glass of TABLE 3. The additional cerium carbonate during the first thirty six hour period of Campaign B is made to oxidize the ferrous iron in the melting section 26 and in the refining section 56 of the furnace 20. At the end of the initial thirty six hour period, the glass batch materials for the LIRA lithium glass are moved into the melting section 46 of the furnace 20 as discussed above.

In another non-limiting embodiment of the invention, if a glass being made has sufficient UV absorber, e.g. cerium oxide, after the thirty-six hour pulse, no further additions of cerium carbonate are necessary if sufficiently low iron batch, e.g. but not limiting to the invention batch having less than 0.0005 wt % is used to make the glass not having a UV absorber.

The invention is not limited to the number or the length of the pulses, or the wt % of the cerium oxide in the pulses. In the practice of the invention, the wt % of cerium oxide in the pulse is usually 2 to 3 times the wt % of cerium oxide in the LIRA lithium glass batch, and the number of pulses is usually one or two. The time period of each pulse can be varied as needed. The above procedure directed to the use of $CeO_2$ to oxidize the ferrous iron when changing from Campaign A to Campaign B is applicable to the practice of the invention using $MnO_2$, or a mixture of $CeO_2$ and $MnO_2$, to change from Campaign A making HIRA lithium glass to Campaign B making LIRA lithium glass. Although the procedure is the same, the wt % of $MnO_2$, and of the mixture of $CeO_2$ and $MnO_2$ is increased because the cerium oxide is a more effective oxidizer than manganese oxide.

The invention is not limited to the additions of the oxidizers, e.g. but not limited to $CeO_2$, $MnO_2$, and mixtures of $CeO_2$ and $MnO_2$ to the batch materials, and the invention contemplates adding the additional oxidizer to the molten glass in the refiner 56 or to the molten glass in the melter 36 at a position upstream from the waist 54.

In another non-limiting embodiment of the invention, a campaign making LIRA lithium glass is changed to a campaign making HIRA lithium glass by making additions of a reducing agent to reduce the ferric iron to ferrous iron. Reducing agents that can be used in the practice of the Invention include, but are not limited to carbon, carbon containing materials, e.g. but not limited to graphite, sucrose ($C_{12}H_{22}O_{11}$), coal, silicon metal and tin oxide ($SnO_2$). Additional non-limiting embodiments of the invention include, but are not limited to changing campaigns for making different types of soda-lime silicate glasses or any other types of glasses, e.g. going from a HIRA or LIRA lithium glass to a soda-lime silicate glass, or visa versa.

Figure 5:
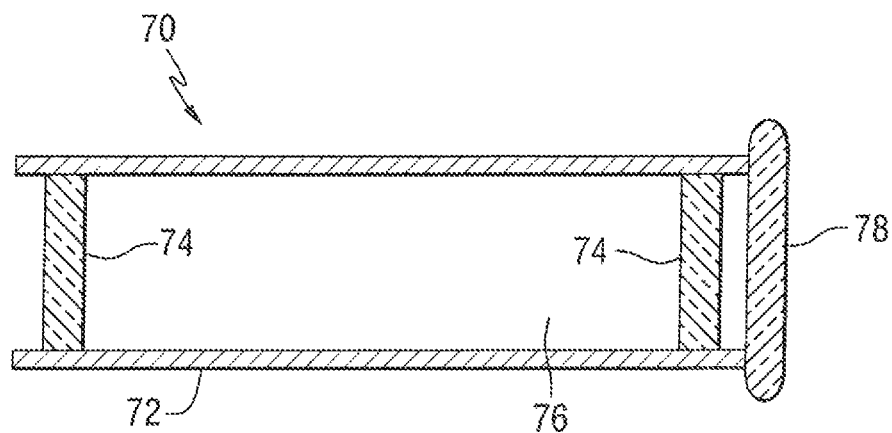
FIG. 5 is a cross sectional side view of a night vision scope of the invention having a protective lens made in accordance to the teachings of the invention.

The use of the HIRA lithium glass, and the LIRA lithium glass, of the invention made during Campaigns A and B is not limiting to the invention and can be processed for use in windows for land, air, space, above water and below water, vehicles; transparencies for commercial and residential windows, covers for solar collectors, and for ballistic viewing windows. The HIRA lithium glass is generally used for viewing windows using a source that provides visible light, and is generally not recommended for viewing infrared energy from objects, e.g. the use of HIRA lithium glasses is not recommended for night goggles. For night vision equipment, the LIRA lithium glass is recommended to protect the lens system of the night vision equipment, e.g. but not limited to night vision goggles and night vision scopes. More particularly and with reference to FIG. 5, there is a shown a night vision rifle scope 70 having a tube 72 and a night vision magnifying lens system 74 mounted in passageway 76 of the tube 72. A ballistic lens 78 made of a chemically strengthened LIRA lithium glass is mounted at an end of the tube spaced from the lens system 74. With this arrangement, the lens system 74 is protected against breakage by the chemically strengthened LIRA lithium glass lens of the invention. LIRA lithium glass can also be used for specialty applications, including but not limiting to the invention its use in furniture, appliances, and shower doors.

Figure 6:
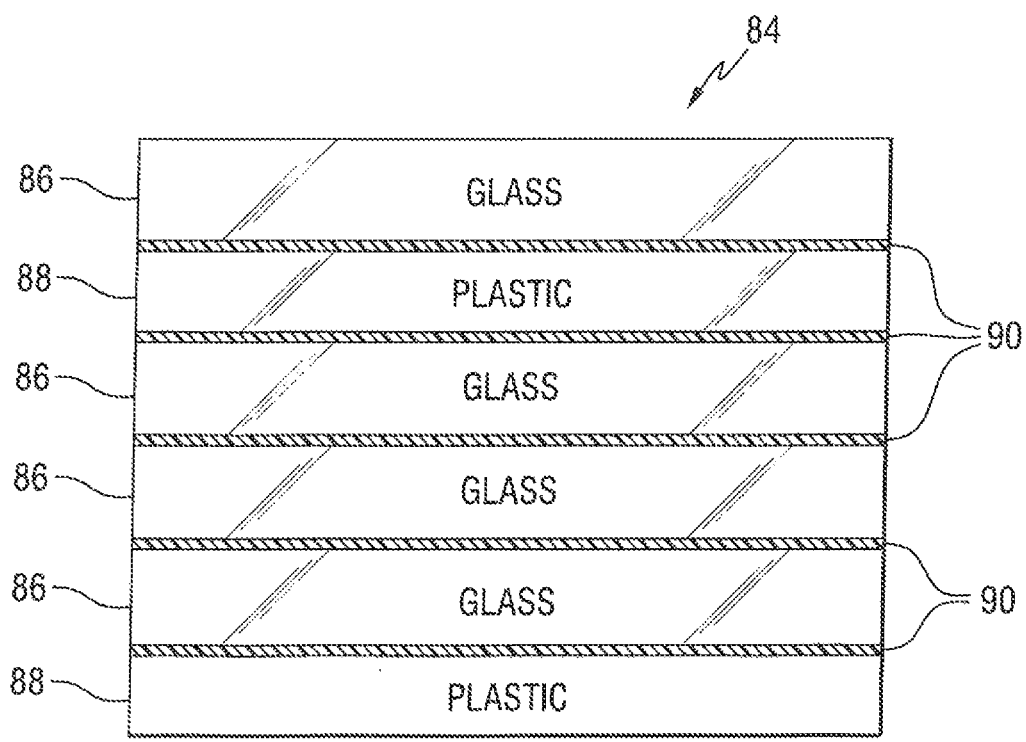
FIG. 6 is a side elevated view of a laminated ballistic lens or window incorporating features of the invention.

With reference to FIG. 6, there is shown a non-limiting embodiment of a ballistic lens or window 84. The window 84 includes a plurality of LIRA lithium chemically strengthened glass sheets 86 and plastic sheets 88 laminated together by plastic interlayer material 90 of the type used in the laminating art.

In the practice of the non-limiting embodiments of the invention, the LIRA and HIRA lithium glasses can be uncoated or coated with any type of coating, e.g. but not limited to an environmental coating to selectively pass predetermined wavelength ranges of light and energy, a photocatalytic film or water-reducing film, or a transparent conducting oxide e.g. of the types disclosed in U.S. Pat. Nos. 5,873,203 and 5,469,657, which patents are incorporated herein by reference.

The invention is not limited to the embodiments of the invention presented and discussed above which are presented for illustration purposes only, and the scope of the invention is only limited by the scope of the following claims and any additional claims that are added to applications having direct or indirect linage to this application.

What is claimed is:

1. A glass composition consisting essentially of a lithium base glass portion; a colorant portion, and an oxidizer, wherein the lithium base glass portion consisting essentially of:

| Component | Range |
| --- | --- |
| $SiO_2$ | 60-63 wt % |
| $Na_2O$ | 10-12 wt % |
| $Li_2O$ | 4-5.5 wt % |
| $Al_2O_3$ | 17-19 wt % |
| $ZrO_2$ | 2-5 wt % |
| ($Al_2O_3$ + $ZrO_2$) | 21.5-24 wt %, | the colorant portion consisting essentially of:

| Component | Range |
| --- | --- |
| FeO | 0.0005-0.015 wt % |
| $Fe_2O_3$ (total iron) | 50-1200 ppm; and | a redox ratio in the range of 0.005-0.15, and
the oxidizer consisting essentially of cerium oxide in the range of greater than 0 to 0.50 wt % and/or manganese oxide in the range of greater than 0 to 0.75 wt % wherein the glass has a visible transmission of greater than 88%, an infrared transmission of greater than 85%, and an infrared viewing transmission of greater than 80%, wherein the spectral properties of the glass given above are reported at a glass thickness of 0.223 inch (5.7 millimeters), and the visible transmission is determined using CIE Standard Illuminant A with a 2° observer over a wavelength range of 380 to 780 nanometers; the infrared transmission is determined using Parry Moon air mass 2.0 direct solar irradiance data over a wavelength range of 800 to 2100 nm, and the infrared viewing transmission is determined using the relative spectral irradiance of CIE Standard Illuminant A and the response function of the viewing device over the wavelength range 400 to 930 nm.

2. The glass composition according to claim 1, wherein the cerium oxide is in the range of 0.01 to 0.15 wt %.

3. The glass composition according to claim 1, wherein the FeO is in the range of 0.001-0.010 wt %.

4. The glass composition according to claim 1, wherein the $Fe_2O_3$ (total iron) is in the range of 50 to 300 ppm.

5. The glass composition according to claim 1, wherein the redox ratio is in the range of 0.005 to 0.10.

6. The glass composition according to claim 1, wherein the oxidizer is selected from the group of cerium oxide in the range of 0.02 to 0.45 wt %, manganese oxide in the range of 0.02 to 0.50 wt % and mixtures thereof.

7. The glass composition according to claim 1, wherein the FeO is in the range of 0.001-0.010 wt %; the total iron is in the range of 50 to 300 ppm; the redox ratio is in the range of 0.005 to 0.10 and the oxidizer is selected from the group of cerium oxide in the range of 0.02 to 0.45 wt %, manganese oxide in the range of 0.02 to 0.50 wt % and mixtures thereof.

8. The glass composition according to claim 1, wherein the FeO is in the range of 0.001-0.010 wt %; the total iron is in the range of 50 to 200 ppm; the redox ratio is in the range of 0.005 to 0.10 and the oxidizer is selected from the group of cerium oxide in the range of 0.02 to 0.45 wt %, manganese oxide in the range of 0.02 to 0.50 wt % and mixtures thereof.

9. The glass composition according to claim 1, wherein the oxidizer is a mixture of cerium oxide and manganese oxide wherein the total concentration of cerium and manganese oxides is in the range of 0.02 to 0.675%.

10. The glass composition according to claim 1 wherein $Fe_2O_3$ (total iron) is in an amount within at least one of the following ranges 50-500 ppm, 50-350 ppm; 75-300 ppm; 100-250 ppm; 200-400 ppm; 300-600 ppm; 500-900 ppm; 700-1100 ppm; 900-1200 ppm, and 500-1200 ppm.

11. The glass according to claim 1 wherein the $Fe_2O_3$ (total iron) is in the range of 50-300 ppm, and the visible wavelength range is 380 to 780 nanometers (hereinafter also referred to as "nm"), and the near infrared wavelength range is 800 to 2100 nm of the electromagnetic spectrum, wherein the spectral properties of the glass given above are reported at a thickness of 0.223 inch (5.7 millimeters), and the visible transmission is determined using CIE Standard Illuminant A with a 2° observer over a wavelength range of 380 to 780 nanometers and the infrared transmittance is determined using Parry Moon air mass 2.0 direct solar irradiance data over a wavelength range of 800 to 2100 nm.

12. The glass according to claim 11, wherein the glass has an infrared viewing transmission of greater than 80% in a wavelength range of 400 to 920 nm of the electromagnetic spectrum, wherein the spectral properties of the glass given above are reported at a thickness of 0.223 inch (5.7 millimeters), and the infrared viewing transmittance is determined using the relative spectral irradiance of CIE Standard Illuminant A and the response function of the viewing device over the wavelength range 400 to 930 nm.

13. The glass according to claim 12 wherein the $Fe_2O_3$ (total iron) is in the range of 50-300 ppm, and the lithium base glass portion consisting essentially of:

| Component | Range |
|---|---|
| $SiO_2$ | 60-63 wt % |
| $Na_2O$ | 10-12 wt % |
| $Li_2O$ | 4-5.5 wt % |
| $Al_2O_3$ | 17-19 wt % |
| $ZrO_2$ | 2-5 wt %, and |
| $(Al_2O_3 + ZrO_2)$ | 21.5-24 wt %. |

14. The glass according to claim 1 wherein the glass is a low infrared absorbing lithium glass.

* * * * *